Sept. 22, 1942.   J. F. H. DOUGLAS   2,296,776
ALTERNATING CURRENT MOTOR
Filed April 1, 1940   2 Sheets-Sheet 1

Inventor
John F. H. Douglas
By Arthur Simon
Attorney

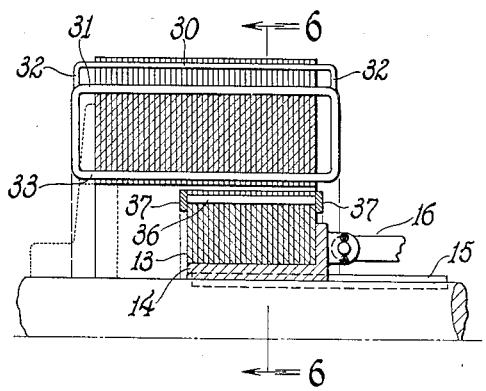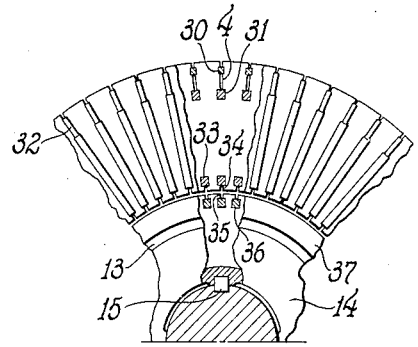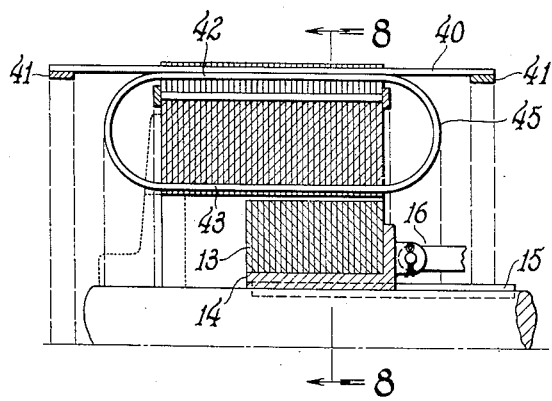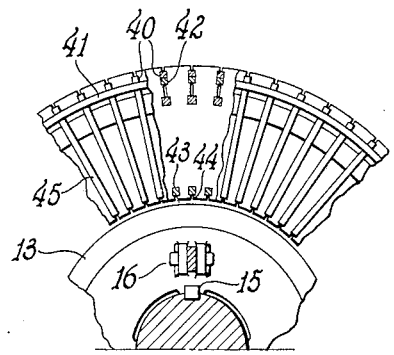

Patented Sept. 22, 1942

2,296,776

UNITED STATES PATENT OFFICE 2,296,776

ALTERNATING CURRENT MOTOR

John F. H. Douglas, Milwaukee, Wis.

Application April 1, 1940, Serial No. 327,186

15 Claims. (Cl. 172—274)

The invention relates to dynamo-electric machines and particularly to alternating current motors in which the currents in a secondary winding are induced by a current flowing in a primary winding connected to the supply line, whereby the motor torque may be varied by varying the effective impedance of the secondary winding. Induction and repulsion motors are of the aforementioned type.

An object of the invention is to provide a motor of the aforementioned type whose torque characteristic may be varied within wide limits.

Another object is to provide a motor having a relatively high starting torque for a given input current.

Another object is to provide a motor having a relatively high power factor at all loads and speeds.

Another object is to provide a motor of relatively small size and which is simple in construction and of low cost.

Another object is to provide a motor of high efficiency.

Another object is to provide a motor the torque characteristic of which may be easily adjusted or controlled.

Another object is to provide a motor in which the heat due to the starting current is efficiently dissipated.

Another object is to provide a motor with improved starting and speed regulating characteristics.

Other objects and advantages will hereinafter appear.

The invention comprises an alternating current motor having a stator provided with an energizing winding which creates a magnetic flux and a rotor provided with one or more secondary windings interlinked with said flux and an auxiliary magnetic circuit which is interlinked with at least one of said secondary windings and located outside of the direct influence of said magnetic flux and whose reluctance may be varied for affording variations of the effective resistance of the respective secondary winding in response and inversely to the reluctance variations.

The accompanying drawings are illustrative of several embodiments of the invention.

Figs. 5 and 6 show a further modification in which the auxiliary circuit affects both secondary windings, but to a different degree, while Figs. 7 and 8 show a still further modification in which a motor is provided with two secondary windings, one of which is provided with two parallel current paths whereby the effective impedance of one of said paths is varied by inductive means to thereby vary the effective impedance of said winding.

Figure 1:
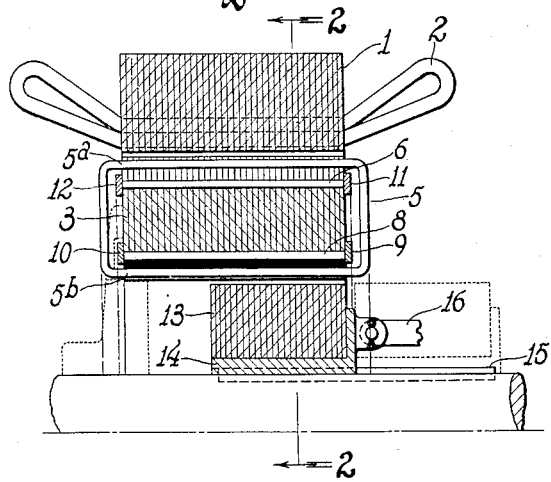
Figs. 1 and 2 illustrate an induction motor having two squirrel cage secondary windings, the inherent impedance of one of which is varied by varying the impedance of an auxiliary electromagnetic circuit coupled to the respective secondary winding.
Figure 2:
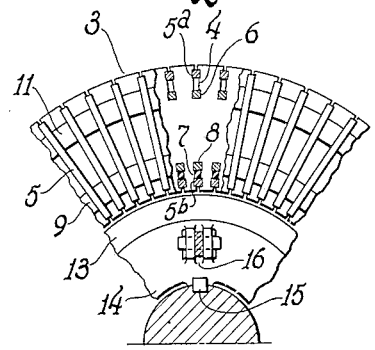

Referring to Figs. 1 and 2, the same illustrate a squirrel cage motor having a stator core 1 which is provided with a conventional multiphase primary winding 2 and a circular cylindrical ring-shaped rotor core 3 which is provided at its outer circumference with slots 4, the slots being arranged to receive bars 5a of an outer rotor winding 5 and of an inner squirrel cage winding 6. At its inner circumference the rotor 3 is provided with slots 7 corresponding in number and arranged similarly to the slots 4 to receive the return bars 5b to form with the respective bars 5a closed loops of winding 5 and bars 8 which latter form an auxiliary squirrel cage winding with the end rings 9 and 10 respectively, arranged on opposite sides of the rotor. The bars 5a and 6 are radially spaced from each other by a constriction in the slots 4. It will also be observed that the winding 6 is provided with end rings 11 and 12 respectively, in a conventional manner. Inside of the bore of the rotor 3 is arranged a laminated core in the shape of an iron ring 13 which is supported by a non-magnetic cylinder 14, the latter being mounted on the motor shaft and guided by a key 15. It may be reciprocated by manual or other means as shown at 16 so that the core 13 may be moved in and out of the rotor 3 as shown by dotted lines in Fig. 1. When the core 13 is inside of the rotor 3 it reduces the reluctance of the path for the magnetic flux induced by the conductors 5b and encircling the slots 7 by shunting the air gap of said path.

When the motor is started and the rotor 3 stands still or rotates at a relatively low speed a major part of the secondary current induced by the primary flux flows in the winding 5 of the rotor winding and inasmuch as the power factor of the current in winding 6 is very low, the impedance of the winding 5 is an important factor which determines the total effective impedance of the torque of the motor. The current flowing in the winding 5 of course flows through the bars 5b which as aforementioned, are inductively coupled with the bars 8, the coupling being a maximum when the core 13 is inside of the rotor and a minimum when the core is completely withdrawn from the rotor as shown in dotted lines. The auxiliary squirrel cage winding comprising the bars 8 and the end rings 9 and 10 preferably has a high resistive component relative to its inductive component so that currents flowing in the bars 5b induce currents in said auxiliary squirrel cage winding which increase the effective resistive component of the winding 5 in the same manner as if a wound rotor winding with external resistance were used. As the motor speeds up the core 13 is preferably gradually withdrawn from the rotor so as to reduce the coupling between the winding 5 and the winding 8 thereby decreasing the resistive load on the winding 5 and thus the total effective resistance of this winding which results in an increase of the motor speed for the instant load. Furthermore as the speed increases a gradually increased proportion of the induced rotor current flows in the bars 6 which together with the end rings 11 and 12 form a squirrel cage winding of relatively low resistance and which when the motor runs near its synchronous speed carries a relatively large portion of the secondary energy so that the motor after having come up to full speed operates as an induction motor of low slip producing resistance.

Figure 3:
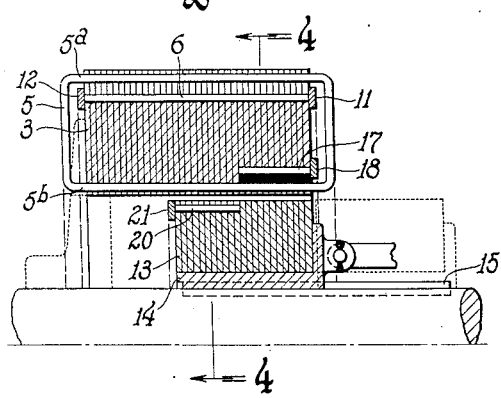
Figs. 3 and 4 illustrate a modification of Fig. 1 in which the parts of the auxiliary circuit are arranged in a different manner relative to each other.
Figure 4:
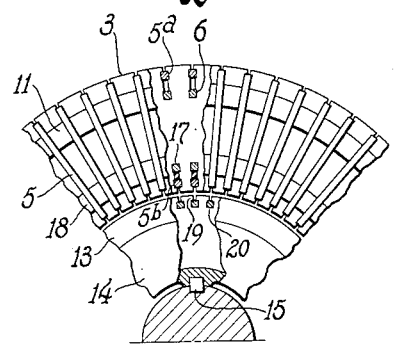

The modification illustrated in Figs. 3 and 4 differs from the structure aforedescribed in that the auxiliary squirrel cage winding 8 of Figs. 1 and 2 is replaced by a winding having bars 17 which extend only through part of the rotor laminations and which are arranged in conductive relation thereto, while an end ring 18 conductively connects the ends of the bars 17 which extend to the outside of the rotor laminations. The currents induced in the bars 17 therefore pass through the laminations. Furthermore the core 13 is provided at its circumference with radial slots 19 in which are placed conducting bars 20 arranged to make contact with the laminations of said core and having their outer ends connected together by an end ring 21. Both auxiliary windings 17 and 20 have a relatively high resistance component of their total effective impedance. As long as the core 13 is inside of the rotor the currents induced in the windings 17 and 20 increase the effective resistance of the windings 5. As the ring is gradually withdrawn from the inside of the rotor 3, the inductive coupling between the winding 5 and the windings 17 and 20 gradually decreases, thereby decreasing the currents induced in the last mentioned windings or causing the induced current to divide between them and thus decreasing the effective resistance of the winding 5 with the effect aforedescribed in connection with Figs. 1 and 2.

Windings 17 and 20 are in effect connected in parallel, thus effecting a bigger change for a given lateral motion of the core.

In the construction illustrated in Figs. 5 and 6 the rotor periphery is provided with radial slots 4 similar to those previously described. In each slot is arranged an outer bar 30 and an inner bar 31, the two bars being connected in parallel with each other by end connections 32 at both ends of the rotor. These end connections are continued radially to join the return conductors or bars 33 arranged in slots 34 on the inner periphery of the rotor ring 3. Preferably the bars 30 are of high resistance to afford a high torque at low speed of the motor when most of the secondary currents are induced in the outer bars as aforediscussed, while the bars 31 are of relatively low resistance to afford a low impedance, high power factor and low secondary losses with low slip at full speed of the motor.

The motor is further provided with an axially slideable regulating core 13 which has at its outer periphery slots 35 for the reception of bars 36 of a squirrel cage winding which is completed by end rings 37 at both ends of the core 13. The winding of the core 13 is thus inductively coupled to the bars 33, the coupling ratio depending upon the distance which the core extends into the rotor. The winding 36 has preferably a high resistance which results in a high effective resistive component of the currents induced by it in the bars 33, thus increasing the effective resistance of both the outer and inner secondary windings of the motor formed in part by the bars 30 and 31 respectively. The arrangement just described affords a facile method of varying over a wide range the torque characteristic of the motor at any and particularly at low speed. It is obvious that the bars 36 and end rings 37 may be arranged partly or entirely on the core 3, similar to the arrangement shown in Figs. 1 or 3.

Figs. 7 and 8 illustrate another method of varying the impedance of the outer winding inductively. In this case the outer winding comprises a squirrel cage having bars 40 of relatively high resistance and short circuited by end rings 41 and parallel bars 42 which corresponding bars 43 located in slots 44 on the inner periphery of the rotor form closed loops including the end connections 45. The bars 40 and 42 are in effect and may, if desired, be constructed in the form of a single bar, thus representing a single winding with two parallel connected short circuiting paths, one over the end rings 41 and the other over the bars 43, the two paths having different resistance. The slideable core 13 shunts the air gap of the flux interlinked with the bars 43 and by inserting the core 13 more or less into the rotor the impedance of the circuit including the bars 40 and 42 may be varied. Thus the variation of the impedance of the loops including the bars 43 is reflected in a corresponding variation of the effective impedance of the outer winding of the rotor, thereby affording a means to vary the torque characteristic of the motor. The inner winding 6 of the motor shown in Figs. 7 and 8 may be similar to that described in connection with Figs. 1 to 4 inclusive, in which case its effect will be the same.

As an appreciable part of the secondary energy of the motor is produced in the auxiliary winding which is removed from the air gap and the primary winding, the heat resulting from the dissipation of this energy is more evenly distributed through the machine. This prevents excessive temperatures at certain parts of the machine, thus indirectly affording a smaller machine for a given output and temperature, where frequent starting is required.

While I have shown and described a number of embodiments of the invention, it is to be understood that the invention is capable of other modifications within the scope of the present disclosure and of the appended claims.

What I claim as new and desire to secure by Letters Patent is:

1. An alternating current motor comprising the combination with a stator provided with an energizing winding to create a magnetic flux of a ring-shaped rotor provided with a secondary winding having certain conductors arranged on the outer periphery in inductive relation to said flux and other conductors arranged on the inner periphery of said rotor, a core of magnetic material concentric with and axially slideable inside of said rotor to thereby vary the reluctance of the magnetic circuit surrounding said other conductors, and means to vary the inherent effective resistance of said secondary winding in response and in reverse relation to the variations of said reluctance.

2. An alternating current motor comprising the combination with a stator provided with an energizing winding to create a magnetic flux and a rotor provided with a main winding and an auxiliary secondary winding in inductive relation to said flux, of a magnetic circuit removed from the influence of said flux and interlinked with said main secondary winding, an auxiliary core movable relative to said magnetic circuit to vary its reluctance, and means to vary the inherent effective resistance of said main secondary winding in response and in inverse relation to the variation of said reluctance.

3. An alternating current motor comprising the combination with a stator provided with an energizing winding to create a magnetic flux and a rotor provided with a main and an auxiliary secondary winding in inductive relation to said flux, and including a magnetic circuit removed from the influence of said flux, said magnetic circuit being interlinked with said main secondary winding, an auxiliary core movable relative to said magnetic circuit to vary its reluctance, and an auxiliary winding disposed to be inductively coupled to the main secondary winding by said magnetic circuit.

4. An alternating current motor comprising the combination with a stator provided with an energizing winding to create a magnetic flux and a rotor provided with a secondary winding in inductive relation to said flux, and including a magnetic circuit removed from the influence of said flux, said magnetic circuit being interlinked with said secondary winding, an auxiliary core movable relative to said magnetic circuit, and an auxiliary winding disposed on said magnetic circuit to be inductively coupled to said secondary winding in accordance with said relative movement of said core.

5. An alternating current motor comprising the combination with a stator provided with an energizing winding to create a magnetic flux and a rotor provided with a secondary winding in inductive relation to said flux, of a magnetic circuit removed from the influence of said flux and interlinked with said secondary winding, an auxiliary core movable relative to said magnetic circuit to vary its reluctance, and an auxiliary winding disposed on said core and on said magnetic circuit, respectively, to be each inductively coupled to said secondary winding in accordance with said relative movement of said core.

6. An alternating current motor comprising the combination with a stator provided with an energizing winding to create a magnetic flux and a rotor provided with a main and an auxiliary secondary winding in inductive relation to said flux, and including a magnetic circuit removed from the influence of said flux, said magnetic circuit being interlinked with said main winding, an auxiliary core movable relative to said magnetic circuit to vary its reluctance, and an auxiliary winding disposed on said core to be inductively coupled to the main secondary winding by said magnetic circuit.

7. An alternating current motor comprising the combination with a stator provided with an energizing winding to create a magnetic flux and a rotor provided with a plurality of secondary windings in inductive relation to said flux, and including a magnetic circuit removed from the influence of said flux, said magnetic circuit being interlinked with at least one of said secondary windings, an auxiliary core movable relative to said magnetic circuit to vary its reluctance, and an auxiliary winding disposed on said magnetic circuit to be inductively coupled to the respective secondary winding in accordance with said relative movement of said core.

8. An alternating current motor comprising the combination with a stator provided with an energizing winding to create a magnetic flux, and a rotor, of a secondary winding on said rotor having conductors in inductive relation to said flux and further having a plurality of parallel return circuits for the currents induced in said conductors, a magnetic circuit removed from the influence of said flux and interlinked with one of said return circuits, an auxiliary core movable relative to said magnetic circuit to vary its reluctance to effect variation of the inherent effective resistance of said secondary winding.

9. An alternating current motor comprising the combination of a stator provided with an energizing winding to create a magnetic flux and a rotor provided with a secondary winding in inductive relation to said flux, of a second secondary winding on said rotor having conductors in inductive relation to said flux and further having a plurality of parallel return circuits for the currents induced in said conductors, a magnetic circuit removed from the influence of said flux and interlinked with one of said return circuits, an auxiliary core movable relative to said magnetic circuit to vary its reluctance to effect variation of the inherent effective resistance of said second secondary winding.

10. An alternating current motor comprising the combination with a stator provided with an energizing winding to create a magnetic flux and a rotor provided with a plurality of secondary windings of different resistance in inductive relation to said flux, said secondary winding connected in parallel with each other and in series with a common return circuit, of a magnetic circuit removed from the influence of said flux and interlinked with said return circuit, and an auxiliary core movable relative to said magnetic circuit to vary its reluctance to effect variation of the inherent effective resistance of said secondary windings.

11. An alternating current motor comprising the combination with a stator provided with an energizing winding to create a magnetic flux and a rotor provided with a plurality of secondary windings of different resistance in inductive relation to said flux, said secondary windings connected in parallel with each other and in series with a common return circuit, of a magnetic circuit removed from the influence of said flux and interlinked with said return circuit, an auxiliary core movable relative to said magnetic circuit to vary its reluctance, and an auxiliary winding disposed to be inductively coupled to said return circuit by said magnetic circuit.

12. An alternating current motor comprising the combination with a stator provided with an energizing winding to create a magnetic flux and a rotor provided with a plurality of secondary windings of different resistance in inductive relation to said flux, said secondary windings connected in parallel with each other and in series with a common return circuit, of a magnetic circuit removed from the influence of said flux and interlinked with said return circuit, an auxiliary core movable relative to said magnetic circuit, and an auxiliary winding disposed on said magnetic circuit to be inductively coupled to said return circuit in accordance with said relative movement of said core.

13. An alternating current motor comprising the combination with a primary electromagnetic circuit having a winding adapted to induce a flux, of a secondary electromagnetic circuit having a rotor, a movable core forming with said rotor an auxiliary magnetic circuit and providing for varying its reluctance, and at least three sections of secondary windings, at least one of said sections being arranged on said rotor in inductive relation to said flux, at least one of said sections being arranged in inductive relation to said auxiliary magnetic circuit, and at least two of said sections being conductively connected with each other.

14. An alternating current motor comprising the combination with a primary electromagnetic circuit having a winding adapted to induce a flux, of a secondary electromagnetic circuit having a rotor, a movable core forming with said rotor an auxiliary magnetic circuit and providing for varying its reluctance and at least three sections of secondary windings, at least one of said sections being arranged on said rotor in inductive relation to said flux, at least one of said sections being arranged in inductive relation to said auxiliary magnetic circuit, at least two of said sections being conductively connected with each other, and one of said sections having a relatively high resistance with respect to the other two sections.

15. An alternating current motor comprising the combination with a primary electromagnetic circuit having a winding adapted to induce a flux, of a secondary electromagnetic circuit having a rotor, a movable core forming with said rotor an auxiliary magnetic circuit and providing for varying its reluctance and at least three sections of secondary windings, at least one of said sections being arranged on said rotor in inductive relation to said flux, at least one of said sections being arranged in inductive relation to said auxiliary magnetic circuit, at least two of said sections being conductively connected with each other, and one of said sections having a relatively high resistance with respect to the other two sections, and completing an electrical circuit in inductive relation to said magnetic circuit.

JOHN F. H. DOUGLAS.